: 2,856,409
Patented Oct. 14, 1958

2,856,409

PURIFICATION PROCESS FOR VITAMIN $B_6$ INTERMEDIATE

Fred B. Dorf, Plainfield, Frank W. Bagienski, Manville, and Kenneth H. Collins, North Plainfield, N. J., assignors to American Cyanamid Company, New York, N. Y., a corporation of Maine No Drawing. Application September 9, 1957
Serial No. 682,629

13 Claims. (Cl. 260—294.9)

This invention relates to an improved process of preparing 3-amino-4,5-bis(aminomethyl)-2-methylpyridine and more particularly to an improved method of purification of 2-chloro-3,4-dicyano-6-methyl-5-nitropyridine, (2-chloro-6-methyl-5-nitro-cinchomerononitrile).

The present invention is an improved step or series of steps in the synthesis of pyridoxine (vitamin $B_6$). The synthesis of pyridoxine involves, among others, the step of chlorinating 3,4-dicyano-6-methyl-5-nitro-2(1 H)-pyridone, which produces 2-chloro-3,4-dicyano-6-methyl-5-nitropyridine, which is called in the art the "chloro compound," which shortened terminology will be used in the general part of the present specification. The chlorination process usually involves the use of elemental chlorine in a mixture of phosphorus oxychloride and phosphorus trichloride. The chloro compound is then reduced catalytically to 3-amino-4,5-bis(aminomethyl)-2-methylpyridine, which is usually known in the art as the "triamine," which shorter terminology will be used in the general portion of the specification.

Because of the numerous process steps and the cost of raw material, yields in the various steps are of great importance in the cost of the final pyridoxine, and one of the problems presented is in the catalytic reduction of the chloro compound to the triamine. Losses in this step amount in general to about 40% and apparently result from the presence of certain by-products in the crude chloro compound. What these undesirable by-products are is not known, and the present invention is not limited to any theory of just what they are. According to the present invention a crude chloro compound prepared by the process described above is dissolved in a lower fatty acid and then is oxidized in the presence of a small amount of a mineral acid. The product is then recovered by the addition of water, and filtration, and when it is then reduced to the triamine, losses in the step are reduced by a factor of from 10–12%. The phenomenon appears to be an oxidation because a wide variety of oxidizing agents may be used, but whether the oxidation destroys interfering by-products or transforms them into compounds which are less deleterious to the catalytic reduction to the triamine compound is not known. That a purification is effected is however known because the color of the chloro compound obtained is better, and spectrophotometric analysis shows that there is present a compound of increased purity.

It is an advantage that the oxidizing agent used is in no sense critical, and in general any of the ordinary oxidizing agents which can be used in the presence of a very small amount of mineral acids may be employed. Typical oxidizing agents are hypochlorites, hydrogen peroxide, permanganates, dichromates, and potassium iodide-iodine solutions. The amount of oxidizing agent is also not critical. As in all chemical reactions, there is a lower limit below which reaction does not proceed to a satisfactory degree. In general in the case of the present invention, this lower limit is 0.03 part of oxidizing agent per part of crude chloro compound. Below this amount of oxidizing agent the effects of the invention begin to fall off fairly sharply. In general we prefer to use about 0.05 part of oxidizing agent for optimum results. This gives us sufficient margin of safety so that extreme provision in supervision of the reaction becomes unnecessary. Somewhat larger amounts of oxidizing agents may be used, and, in fact, there is no definite upper limit. However, when the amount of 0.5 part of oxidizing agent is greatly exceeded, no improvement results and the cost of the treatment is increased. In general, therefore, it may be said that there is no advantage in using more than 0.1 part, which may be considered as an economic limit, although it should be understood that the invention is not limited thereto, because with larger amounts of oxidizing agents the results are still excellent, but the added cost is not justified as there is no improvement.

The amount of mineral acid, which may be any ordinary mineral acid such as hydrochloric, nitric, sulfuric, orthophosphoric and the like, is also not at all critical. Here, too, there is obviously a lower limit below which effectiveness falls off. In general this lower limit is substantially the same as in the case of the oxidizing agent, namely 0.03 part of mineral acid per part of crude chloro compound. There is no definite upper limit and in general, while it is desirable to use somewhat more acid than corresponds to the minimum, large amounts of acid are not advantageous and merely add to the cost, though they do not render the process inoperative.

Any of the lower fatty acids may be used as a reaction medium such as formic, acetic, propionic, etc., and, of course, mixtures may be used. Because of its low cost, acetic acid is preferred for economic reasons. The amount of the lower fatty acid to be used is also not critical. Again, there is a lower limit below which the reaction medium becomes difficult to handle, and this corresponds to about 4–4.5 parts of acid per part of crude chloro compound. Much larger amounts of acid may be used, but as there is little advantage beyond 5 or 6 parts of acid per part of chloro compound large amounts of acid are not preferred as they merely add to the cost and make recovery more difficult.

While it has been pointed out any of the oxidizing agents may be used with any of the ordinary mineral acids, sodium hypochlorite is preferred as an oxidizing agent, both because of cheapness and excellent results, and hydrochloric acid is the preferred mineral acid.

The invention will be described in greater detail in conjunction with the following specific examples in which the parts are by weight unless otherwise specified.

EXAMPLE 1

*Purification of 2-chloro-6-methyl-5-nitrocinchomerononitrile*

Crude chloro compound containing about 450 parts of the actual chemicals is dissolved in 1700 parts of glacial acetic acid with gentle warming to 40–45° C. The solution is then clarified with activated carbon and a filter aid, the filtration taking place at 30–35° C. In general about 40 parts of activated carbon and 15 parts of filter acid are used. Filter cake obtained is washed with 750 parts of glacial acetic acid, and the wash is then added to the main filtrate. Thereupon, 150 parts of 15% aqueous sodium hypochlorite solution is stirred in, and 50 parts of 12 N hydrochloric acid is added, whereupon the solution is heated at 40–45° C. until reaction is complete. 1.75 volumes of water per volume of solution are then slowly added, the mixture cooled to 10° C. and the precipitate which is formed removed by filtration. The filter cake is washed with cold water and the purity of the chloro compound determined by ultraviolet spectrophotometer. A 95% recovery is obtained.

The purified chloro compound is then reduced catalytically as follows:

A catalyst is prepared by dissolving 0.55 part of $PdCl_2.2H_2O$ in 3.5 parts of concentrated hydrochloric acid, 119 parts of methanol and 170 parts of water and adding thereto 4.5 parts of an activated charcoal. After placing in an autoclave and replacing the air in the autoclave with nitrogen, the temperature is adjusted to about −40° C., and the palladium chloride is reduced with hydrogen.

The temperature of the catalyst slurry is then adjusted to 35–40° C. and 62 parts of dilute hydrochloric acid and 19.3 parts of 2-chloro-3,4-dicyano-6-methyl-5-nitropyridine dissolved in acetic acid are added. Reduction is carried out in the autoclave with hydrogen at about 10 lbs. pressure.

When the reduction is complete, the hydrogen in the autoclave is replaced with nitrogen and the spent catalyst is removed by filtration. The product is isolated from the filtrate as the trihydrochloride by treatment with concentrated hydrochloric acid and ethanol, cooling and filtering. After washing the solid with ethanol and drying, the product obtained is shown by ultraviolet analysis to contain 15.8 parts of 2-methyl-3-amino-4,5-bis(aminomethyl)pyridine trihydrochloride (66% of the theoretical yield). This represents a reduction in the loss of triamine of about 12.

EXAMPLE 2

The procedure of Example 1 is repeated substituting hydrogen peroxide for the sodium hypochlorite. The results are similar to those in Example 1 with losses in the triamine reduction approximating 10%.

The same results are obtained by replacing sodium hypochlorite with potassium permanganate, sodium dichromate and potassium iodide-iodine solution.

In the above examples single oxidizing agents have been described. The same results are obtained when mixtures are used.

EXAMPLE 3

The procedure of Example 2 is repeated substituting propionic acid for acetic acid. The results obtained are the same, there being no significant difference in the decreases of losses in the step of reducing the chloro compound to the triamine.

EXAMPLE 4

The procedure of Example 1 is repeated replacing the hydrochloric acid with the corresponding amount of sulfuric acid. The results are similar to those obtained in Example 1, the reduction losses being only slightly less.

We claim:
1. A method for the purification of 2-chloro-3,4-dicyano-6-methyl-5-nitropyridine prepared by chlorination of 3,4-dicyano-6-methyl-5-nitro-2(1 H)-pyridone which comprises heating the crude compound in solution in a lower fatty acid with at least 0.03 part of an oxidizing agent and in the presence of at least 0.03 part of a mineral acid.
2. The process according to claim 1 in which the oxidizing agent is sodium hypochlorite.
3. The process according to claim 2 in which the lower fatty acid is acetic acid.
4. The process according to claim 1 in which the lower fatty acid is acetic acid.
5. The process according to claim 1 in which the oxidizing agent is hydrogen peroxide.
6. The process according to claim 5 in which the lower fatty acid is acetic acid.
7. The process according to claim 1 in which the oxidizing agent is potassium permanganate.
8. The process according to claim 7 in which the lower fatty acid is acetic acid.
9. The process according to claim 1 in which the oxidizing agent is sodium dichromate.
10. The process according to claim 9 in which the lower fatty acid is acetic acid.
11. The process according to claim 1 in which the oxidizing agent is potassium iodide-iodine solution.
12. The process according to claim 11 in which the lower fatty acid is acetic acid.
13. The process according to claim 1 in which the mineral acid is hydrochloric acid.

No references cited.